Aug. 10, 1954 H. F. OLSON ET AL 2,686,296

NOISE REDUCTION SYSTEM

Filed July 14, 1949

INVENTORS
HARRY F. OLSON &
DONALD F. PENNIE
BY [signature]
ATTORNEY

Patented Aug. 10, 1954 2,686,296

UNITED STATES PATENT OFFICE 2,686,296

NOISE REDUCTION SYSTEM

Harry F. Olson and Donald F. Pennie, Princeton, N. J., assignors to Radio Corporation of America, a corporation of Delaware Application July 14, 1949, Serial No. 104,776

2 Claims. (Cl. 333—18)

This invention relates to audio frequency signaling or signal transmission systems wherein it is desirable to suppress, insofar as it is practicable, the "hiss" or background type of noise effects which in varying degrees is nearly always present along with the audio signals which are to be reproduced as sound effects.

In general, it is probably true that there is this type of noise effects present with substantially all audio signals, irrespective of the signal source, but particularly when the signals are derived from a phonograph record. However, when the audio signals are present at relatively high levels, any accompanying noise effects of this character are not particularly objectionable. But, when the audio signal level is relatively low, the signal-to-noise ratio becomes so small that the noise effects, when reproduced, are highly objectionable. When the noise effects are of relatively high frequency, the signal-to-noise ratio, even at relatively high audio signal frequencies, is small, so that when, in addition, the level of the high frequency audio signals is low, the "hiss" noise effects in many cases predominate and become extremely objectionable.

In order to overcome, at least in part, these objectionable manifestations of the "hiss" type of noise effects, numerous noise suppression systems have previously been proposed to suitably attenuate the noise effects. One of these prior art systems which has been quite successfully employed is covered in a copending application of Harry F. Olson, Serial No. 721,119, filed January 9, 1947, now abandoned, and entitled "Audio Noise Reduction System." Essentially, this system separates the audio signals, together with whatever noise effects may be present therewith, into two frequency bands. The low frequency band of signals is passed without modification from the signal source to a suitable output circuit such as an audio signal amplifier, for subsequent impression upon a transducer such as a sound reproducing device. A band of relatively high frequency signals, corresponding approximately to one octave, is passed through a non-linear signal transmission circuit for the purpose of attenuating all signals within the band having less than a predetermined amplitude. The non-linear circuit also has the characteristic of passing, without substantial attenuation, all signals within the one octave high frequency band which have greater than the predetermined amplitude. The two bands of signals then are combined for impression upon the output circuit.

In a system such as that disclosed in the copending Olson application referred to, it was considered necessary to limit the relatively high frequency band of signals passed through the amplitude discriminating circuit to one having a width substantially equal to one octave. This was done for the purpose of minimizing signal distortion, which is more or less inherent in a system of this character by reason of the fact that the non-linear circuit functions in the manner of a clipping circuit. Any clipping action introduces harmonic distortion. Inasmuch as this earlier system did not specifically provide for precise balancing of the non-linear conducting elements of the amplitude discriminating circuit, whereby at least some of the harmonic distortion may be eliminated, it was considered necessary not only to limit the band of frequencies subjected to amplitude discrimination to one having a width substantially equal to one octave but also, to provide an additional band pass filter coupled between the amplitude discriminating circuit and the subsequent audio amplifier.

The amplitude discriminating circuit having a non-linear transmission characteristic utilized in systems of the character disclosed in the aforementioned application of Olson consisted essentially of a pair of unilaterally conducting devices connected in parallel with one another and also, in opposite polarity, to the source of signals. Under ideal conditions, it is desired that each of the unilaterally conducting devices have the property of changing abruptly from a substantially non-conducting state to a highly conducting state in response to voltages impressed thereon exceeding a predetermined threshold value. Thus, any audio signal voltages, together with whatever noise effects may be present therewith, which have amplitudes of less than the threshold voltage of the non-linear devices are not reproduced in the output circuit of the amplitude discriminating circuit. Hence, any noise effects below the level of the threshold voltage are effectively attenuated, at the cost, however, of concomitantly suppressing whatever signal voltages of low level may also be present. Any signal voltages, together with noise effects, which exceed the threshold voltage of the amplitude discriminating circuit are passed therethrough without substantial attenuation or other modification.

In amplitude discriminating circuits of this character, it is customary to set the threshold operating voltage of the non-linear devices substantially at the maximum tolerable level of the noise effects. In this way, there are transmitted to the reproducing apparatus substantially no noise effects of the background or "hiss" type which would render the reproduced sound objectionable.

For use as the non-linear unilaterally conducting devices in an amplitude discriminating circuit of the character described, it has been determined that one of the most effective elements is a germanium crystal. Such a device has the desirable attribute of changing at a rapid rate from a relatively high resistance value to a relatively low resistance value in response to a minimum change in the voltage impressed thereon. However, in order for a germanium crystal to exhibit an optimum performance, it is necessary to impress thereon a biasing voltage of relatively small magnitude, such as a fraction of a volt. In systems such as that described in the copending Olson application referred to, the source of the biasing voltage for the germanium crystals is a small battery, such as a dry cell, or a plurality of such batteries. A biasing voltage source of such a character, however, is not entirely satisfactory for the reason that the voltage supplied thereby does not remain constant during the life of the battery and, furthermore, since such batteries have a somewhat limited life, it is necessary to periodically replace them.

Furthermore, in many of the prior art noise suppression systems including that disclosed in the copending Olson application referred to, rather extensive use was made of separate filters, such as low pass, high pass and band pass types. Individual filters of such character utilize a considerable number of components including, inter alia, many inductors which are expensive so that the total cost of such systems made the use thereof virtually prohibitive in all but a comparatively small number of the more expensive class of instruments.

It is an object of this invention to provide an improved noise reduction system for effecting amplitude discrimination with respect to all signal and/or at least one particularly objectionable type of noise effects within a predetermined band of frequencies.

It is another object of the present invention to provide an effective noise suppression system which requires a minimum of components and which is capable of effecting a high order of attenuation of alternating voltages having less than a predetermined amplitude and within a comparatively wide band of frequencies.

Another object of the invention is to provide a noise suppression system of the character described, wherein use is made of the inherent characteristics of certain of the reproducing apparatus such as a transducer for the suppression of harmonic distortion of the signals which may be produced by reason of the operation of the non-linear, amplitude discriminating noise suppression circuit.

Still another object of the present invention is to provide a means for developing relatively small voltages for use in biasing the unilaterally conducting devices employed in a non-linear signal transmission circuit by deriving these relatively small voltages from the relatively high voltage power supply provided for use in conjunction with the signal amplifying apparatus with which the non-linear circuit is to be used.

A further object of the invention is to provide a means for deriving, from a relatively high unidirectional voltage source, relatively small, equal voltages of opposite polarity for biasing a plurality of oppositely poled, unilaterally conducting devices employed in a non-linear signal transmission circuit.

A still further object of the invention is to provide apparatus for deriving relatively small, equal voltages of opposite polarity from a relatively high unidirectional voltage source for use in biasing the unilaterally conducting devices of a non-linear signal transmission circuit, so that the transmission circuit may be coupled between a low impedance signal source and a high impedance utilization circuit.

A still further object of the invention is to provide apparatus for deriving relatively small, equal voltages of opposite polarity from a relatively high unidirectional voltage source for use in biasing the unilaterally conducting devices of a non-linear signal transmission circuit, so that the transmission circuit may be coupled between a low impedance signal source and a low impedance utilization circuit.

In accordance with the present invention, there is provided, for use in a signaling or signal transmission system, an improved noise reduction facility whereby to efficiently and comparatively inexpensively effect the attenuation of the background or "hiss" type of noise effects which would be objectional if reproduced as sound. The noise reduction facilities comprise a transducer, such as a loud speaker of similar device, for translating electrical signals into sound effects, which is coupled by circuit means including a novel noise reducing circuit arrangement to a source of alternating voltages which comprise signal and/or "hiss" noise effects. Preferably, in accordance with this invention, the transducer has a low pass frequency characteristic; that is, it has a relatively sharp high frequency cut-off, thereby rendering it incapable of response to voltages impressed thereon having frequencies above its cut-off point.

The noise reduction facility comprises an amplitude discriminating circuit employed to couple the transducer to the source of the alternating voltages. In one embodiment of the invention this circuit includes an inductor connected in series with the transducer, and also a frequency responsive circuit coupled to the inductor and tuned for resonance in a band of relatively high frequencies. Further, there is provided a circuit having a non-linear response characteristic which is connected in shunt with the frequency responsive circuit and which is responsive to voltages having frequencies within the resonance band of the frequency responsive circuit so as to variably load the inductor, whereby the latter device functions to attenuate all alternating voltages below a predetermined level. In view of the inherent characteristic of the non-linear circuit to introduce harmonic distortions in the voltages impressed upon the transducer, this device, by reason of its low pass frequency characteristic, serves to effectively suppress distortions of this character.

In still other embodiments of the invention, the transducer is coupled to the signal source by a multichannel signal transmission circuit. Non-linear amplitude discriminating circuits are provided in one or more of these channels and, in each of such channels noise suppression is accomplished over a frequency band of effectively 1½ octaves. The signal transmission circuit includes a minimum number of the relatively expensive types of filters but, instead, incorporates relatively inexpensive types of frequency discriminating devices such as crossover networks.

In accordance with a further feature of the present invention, there is provided a means for developing and impressing upon the unilaterally conducting devices employed in a non-linear amplitude discriminating circuit suitable biasing voltages of relatively small magnitude which may be derived from a source of unidirectional voltage of relatively large magnitude. This voltage developing means comprises a resistor network coupled to the source of unidirectional voltage and to the unilaterally conducting devices, and includes a relatively high resistance bleeder having a relatively low resistance section. The bleeder is connected across the high voltage source and the low resistance section thereof is connected suitably to the electrodes of the unilaterally conducting devices to impress biasing voltages thereon having the desired magnitude and polarity to enable these devices to function as a full-wave, non-linear amplitude discriminating facility.

In accordance with a further feature of the instant invention, there is provided a particular resistor network for deriving the biasing voltages for the unilaterally conducting devices from a source of high voltage, whereby to enable the use of the amplitude discriminating circuit in conjunction with a low impedance signal source and with a high impedance utilization circuit. Also, in accordance with this invention, there is provided a network of the character described which will enable use of the amplitude discriminating circuit in conjunction with a low impedance signal source and a low impedance utilization circuit.

The novel features that are considered characteristic of this invention are set forth with particularity in the appended claims. The invention itself, however, both as to its organization and method of operation, as well as additional objects and advantages thereof, will best be understood from the following description taken in connection with the accompanying drawing.

Figures 1, 2, 3, 4, 5:
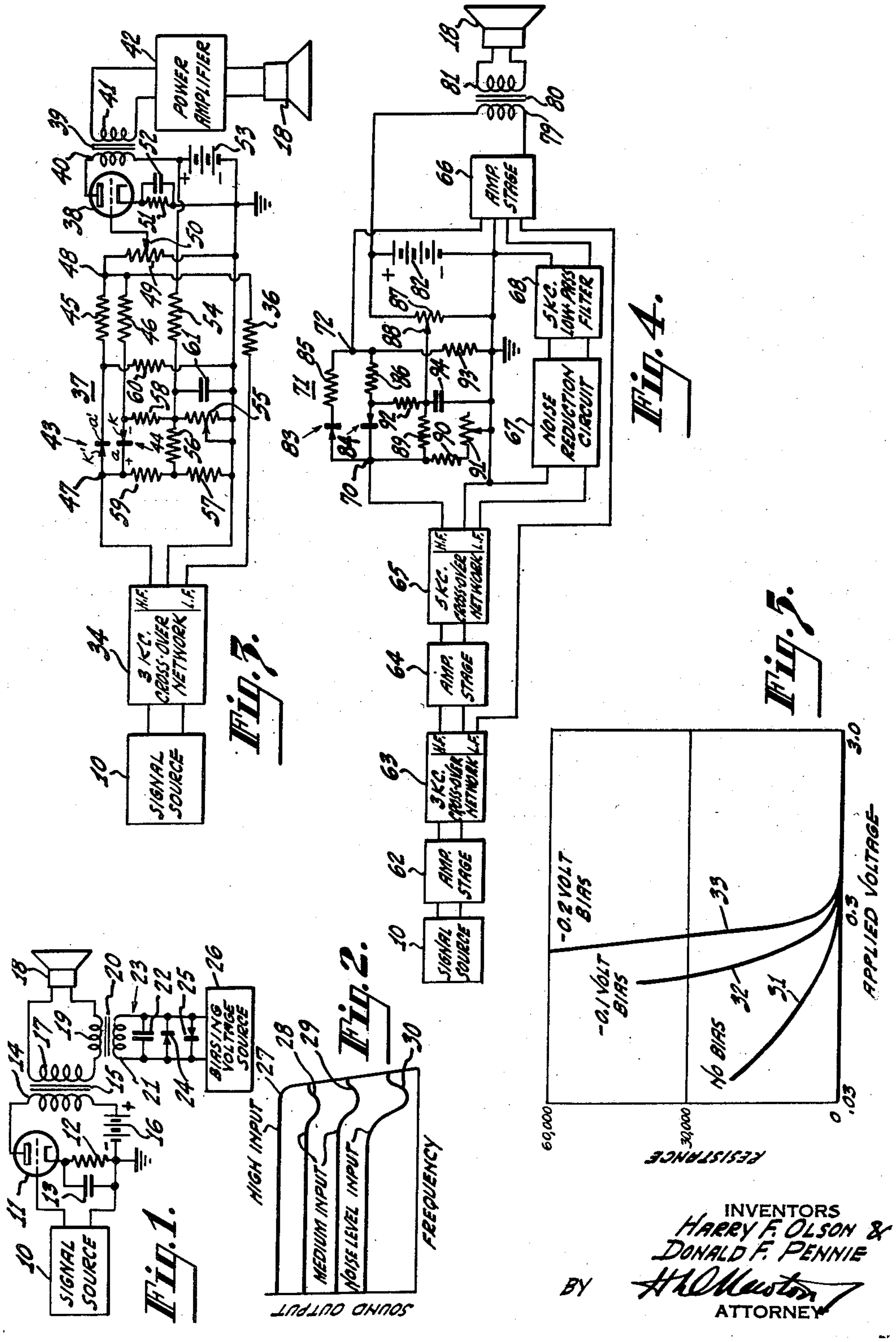
Figure 1 is a circuit diagram illustrating an embodiment of a noise reduction system in accordance with the present invention.
Figure 2 is a series of curves illustrating the operation of a noise reduction system embodying the invention in a form such as that shown in Figure 1, under various conditions.
Figure 3 is a circuit diagram of another embodiment of the invention comprising a one-channel noise reduction circuit and employing a resistor network for deriving the biasing voltages for the unilaterally conducting devices from a source of high voltage, and which is particularly adapted for use in connection with a low impedance signal source and a high impedance utilization circuit.

Figure 4 illustrates another embodiment of the invention comprising a two-channel noise reduction circuit and including a resistor network for deriving the biasing voltages for the unilaterally conducting devices from a high voltage source, and which is particularly adapted for use in conjunction with a low impedance signal source and a low impedance utilization circuit; and Figure 5 is a series of graphs showing the non-linear conducting characteristic of one of the unilaterally conducting devices which is preferred for use in a noise reduction system in accordance with the present invention.

Having reference now to Figure 1 of the drawing, there is shown a signal source 10 which, for example, may be a phonographic pickup device, a detector of a radio receiver, a microphone of a public address system, the pickup device for a film sound track, or other similar apparatus. The signal source is shown coupled to the grid-to-cathode input circuit of an audio amplifying electronic tube 11, which may be provided with a self-biasing circuit including a resistor 12 coupled in the cathode circuit and bypassed for voltages of signal frequency by a capacitor 13. The anode of the tube 11 is coupled by a primary winding 14 of an audio frequency coupling transformer 15 to a source of space current indicated as a battery 16. The secondary winding 17 of the transformer 15 is coupled to a transducer, such as a loud speaker 18, by means including the series connection of an inductor 19.

The inductor 19, in effect, is the primary winding of a transformer 20, which also is provided with a secondary winding represented by an inductor 21. The inductor 21 is parallel-resonated by a capacitor 22 in a band of relatively high frequencies in which it is desired to effect amplitude discrimination for the purpose of reducing the "hiss" type of noise effects. It has been determined that this band of frequencies may comprise one and one-half octaves without seriously introducing sufficient distortion to be noticeable in the sound reproduced by the loud speaker 18. However, it is to be understood that the present invention is not necessarily limited to such a band of frequencies but, instead, may be embodied in other forms wherein the frequency pass band is somewhat less, such as of the order of one octave, or wherein the frequency pass band is greater than one and one-half octaves. There also is connected, in shunt with the parallel resonant circuit 23 comprising the inductor 21 and the capacitor 22, a pair of oppositely poled, unilaterally conducting devices 24 and 25. These devices are required to have the property of conducting in a non-linear manner; that is, in response to voltages below and above a critical operating voltage, the resistance of the devices 24 and 25 should vary from a relatively high value to a relatively low value, respectively. Two of such devices are employed and connected in opposite polarity in order that the noise reduction system be operative at maximum efficiency. With such an arrangement, both polarities of the employed voltages are effective to produce the desired attenuation in order to produce noise reduction. Preferably, although not necessarily, there is connected to the devices 24 and 25 a source 26 of variable biasing voltage, whereby to control the critical operating voltage thereof. Illustrative forms of suitable biasing voltage sources are disclosed in Figures 3 and 4 of the drawing herein and also in the copending Olson application referred to.

Referring now to the operation of the embodiment of the invention illustrated in Figure 1, assume that the alternating voltages which are impressed upon the loud speaker 18 for reproduction are at a relatively high level. Inasmuch as voltages within the pass band of frequencies to which the inductor 21 is tuned have appreciable magnitudes, the impression thereof upon the unilaterally conducting devices 24 and 25 renders these devices highly conductive; or, in other words, the resistance of these devices is relatively low. Thus, the parallel resonant circuit 23 is effectively shunted, whereby this circuit is highly loaded and absorbs a minimum of energy from the inductor 19 so that there is effected little or no attenuation of the voltages within the pass band of frequencies to which the resonant circuit is tuned. In this manner these voltages, together with the lower frequency voltages, are impressed upon the loud speaker 18 for full reproduction thereby.

By reference to Figure 2 of the drawing, which is a graphical representation of the sound output of the loud speaker 18 over the entire frequency range which it is desired to reproduce for various levels of input voltages, the curve 27 represents the operation of the system under the conditions just described. It may be seen that there is substantially no difference in the sound output for any of the signal frequencies. In the case where the input signals are at a somewhat lower level, the unilaterally conducting devices 24 and 25 of Figure 1 exhibit a somewhat greater impedance in response to the lower impressed voltages within the predetermined pass band of frequencies to which the resonant circuit 23 is tuned. Consequently, the loading of this resonant circuit is somewhat less than the maximum conditions previously described, so that the inductor 19 functions to effect some attenuation of the voltages within the predetermined frequency pass band. Conditions of such a character are illustrated in Figure 2 by the curves 28 and 29, which illustrate the operation of the system in response to signal input voltages of medium levels. It will be noted that both of the curves 28 and 29 have depressions therein at the high frequency portion of the range which, in magnitude, are proportional to the respective signal input levels.

When the signal input level is as low as the noise level, for example, the unilaterally conducting devices 24 and 25 exhibit relatively high resistance, thereby producing a minimum loading of the parallel resonant circuit so that it absorbs a maximum of energy from the inductor 19, whereby to effect a relatively high order of attenuation of voltages having frequencies within the band to which the parallel resonant circuit is tuned. This condition is graphically illustrated in Figure 2 by the curve 30, wherein it may be seen, by reference to the prominent depression therein at the high frequency end of the range, that there is no appreciable sound output derived from the loud speaker 18 at frequencies to which the resonant circuit 23 is tuned.

It should be noted that, in the embodiment of the invention illustrated in Figure 1, the unilaterally conducting devices 24 and 25 may be utilized without having any biasing voltages impressed thereon. Such an arrangement is quite satisfactory, particularly for certain types of these devices, such as selenium crystals, for example. However, in a preferred form of the present invention, germanium crystals are employed because they have certain attributes which render them particularly desirable for use as the unilaterally conducting devices. The principal one of these desirable attributes is the property that a germanium crystal has of changing from a relatively high resistance, wherein the device is virtually non-conducting, to a relatively low resistance where it is highly conductive in response to small changes of the voltages impressed thereon. This characteristic of a germanium crystal is illustrated in Figure 5 of the drawing, wherein the curves 31, 32 and 33 represent the changes in resistance of the crystal for different applied voltages and for different values of biasing voltage. From these curves it may be seen that, for any relatively small variation of the applied voltage, the resistance changes through a much greater range and at a much faster rate when the crystal is given even a relatively small fraction of a volt of negative bias.

Consequently, when using germanium crystals as the unilaterally conducting devices in an amplitude discriminating circuit of the character described, it is preferable to initially bias these crystals at a relatively small negative voltage in order to take advantage of the maximum change in resistance of which such a device is capable. It also may be clearly seen from an inspection of the curves of Figure 5 that, in order to make the noise reduction system as flexible as possible, it furthermore is desirable to provide a facility for adjusting the value of the biasing voltage so that the threshold of operation of the system may be suitably chosen to provide for optimum performance thereof for a considerable variety of circumstances. For example, when the signal source is a phonograph pickup device, the level of the background or "hiss" noise effects varies considerably with the type and/or age of the records employed.

When germanium crystals are employed with relatively small negative biasing voltages applied thereto, the noise reduction system operates in such a manner that the amplitude discriminating circuit either is highly conductive for voltages in the band of frequencies subject to the discriminating action, in which case the total sound output from a device such as the loud speaker 18 of Figure 1 is represented by the curve 27 of Figure 2, or is non-conducting to voltages in the high frequency band, so that the output from the loud speaker is as represented in curve 30.

Having reference now to Figure 3 of the drawing, there is shown a one channel noise reduction system embodying an amplitude discriminating circuit of the same general character as that disclosed in Figure 1, with the exception that the unilaterally conducting devices are slightly negatively biased, in accordance with another feature of the invention, by means of voltages derived from a source of relatively high unidirectional voltage. Also, in this embodiment of the invention, the noise reduction system is patterned somewhat after the more general system disclosed in the copending Olson application referred to.

The signal source 10 is coupled to a crossover network 34 which may be generally of a conventional type. Such a network comprises series-derived high and low pass filters both of which have the same cutoff frequency and which are connected in parallel with one another, whereby the usual shunt impedance elements of the respective end sections may be eliminated. A network of this character utilizes a minimum number of costly components and has the property of separating a relatively wide band of frequencies impressed thereon into two frequency bands consisting of (1) all frequencies below the crossover frequency of the network and (2) all frequencies above the crossover frequency. As indicated in Figure 3, the low frequency voltages are developed between the terminal L. F. and ground and the high frequency voltages are developed between the terminals H. F. and ground. The terminal L. F. is connected to one terminal of a resistor 36 and the terminal H. F. is connected to the non-linear amplitude discriminating circuit 37, the output of which is connected to the other terminal of the resistor 36 and also to an amplifier including an electronic tube 38. A coupling transformer 39 including a primary winding 40 coupled to the amplifier tube 38 and a secondary winding 41 serves to couple the output circuit of the tube 38 to the input circuit of a power amplifier 42, the output circuit of which, in turn, is coupled to the loud speaker 18.

Before considering in detail the amplitude discriminating network used in the embodiment of the invention shown in Figure 3, it will be demonstrated in what manner the operating characteristics of the crossover network 34 are determined. As in the embodiment of the invention shown in Figure 1, the present embodiment utilizes the high frequency cutoff characteristic of the loud speaker 18. There first is determined by suitable tests the frequency at which the loud speaker produces substantial attenuation of the signal voltages impressed thereon. For example, it will be assumed that the effective cutoff frequency of the loud speaker 18 is in the neighborhood of 9 kilocycles. In this case, any voltages having frequencies greater than 9 kilocycles will not be converted into sound by the loud speaker. Furthermore, advantage is taken of the fact that any second or higher even harmonic distortion, which might otherwise be produced by the operation of the non-linear amplitude discriminating network, may be eliminated by means presently to be described. Hence, it is only necessary that the loud speaker 18 be capable of suppressing the third and higher odd harmonic distortions produced by the network. Consequently, in the assumed case of a 9 kilocycle frequency cutoff by the loud speaker, the crossover network 34 may be designed to have a crossover frequency of not more than approximately 3 kilocycles. Preferably, the crossover frequency of the network should be slightly less than ⅓ of the loudspeaker cutoff frequency. The lowest third harmonic frequency that can be impressed upon the loud speaker, therefore, is 9 kilocycles. Thus, if the loud speaker is capable of attenuating frequencies of this order or higher, any third or higher harmonic distortion produced by the network 37 will be effectively suppressed. Thus, it may be seen that, according to this example, noise suppression is effected over the 1½ octave band of frequencies from 3 kilocycles to 9 kilocycles.

Considering more in detail the amplitude discriminating circuit 37, it may be seen that it includes a pair of unilaterally conducting devices 43 and 44, connected, respectively, in series with resistors 45 and 46 and also in parallel with one another in inverse relation. The input terminal 47 of the non-linear circuit is coupled to the high frequency terminal H. F. of the cross-over network 34, and the output terminal 48 is connected to a load resistor 49. The load resistor is provided with an adjustable sliding contact 50, which is connected to the control grid of the amplifier tube 38, the cathode of which is connected to ground through a self-biasing circuit including a resistor 51 and a signal frequency bypass capacitor 52. The anode of the amplifier tube 38 is coupled through the primary winding 40 of the output transformer 39 to the positive terminal of a relatively high voltage unidirectional power suply such as represented by the battery 53, the negative terminal of which is grounded.

The biasing voltages for the unilaterally conducting devices 43 and 44 are derived, in accordance with this invention, from the relatively high voltage power supply 53. A relatively high resistance bleeder is connected across the battery 53 and comprises the series connection of a fixed resistor 54 and a variable resistor 55, the major portion of the resistance of this bleeder being in the resistor 54. The relatively low resistance section of the bleeder comprising the resistor 55 is shunted by a voltage divider comprising the series connection of two equal, relatively small resistors 56 and 57. The cathode $k$ of the unilaterally conducting device 44 is connected to one terminal of the voltage divider resistor 56 by means of a resistor 58. The anode $a$ of the device 44 and the cathode $k'$ of the device 43 are coupled to the mid-point of the voltage divider corresponding to the junction point between resistors 56 and 57, by means of the resistor 59. The anode $a'$ of the device 43 is coupled to the other terminal of the voltage divider, which is grounded by means of a resistor 60. The voltage divider 56—57 is bypassed to ground for signal frequencies by a capacitor 61.

Neglecting consideration, for the moment, of the effect of signal voltages impressed upon the amplitude discriminating circuit 37, the manner in which the unilaterally conducting devices 43 and 44 are negatively biased will be described. It may be seen that current flow from the battery 53 traverses the bleeder 54—55 in such a direction that the ungrounded terminal of the low resistance section including resistor 55 is of positive polarity. Consequently, the resultant current flow through the voltage divider 56—57 is in a direction to render the junction point between resistors 56 and 57 of negative polarity relative to the ungrounded terminal of the low resistance bleeder section resistor 55. The positive point of the voltage divider is connected by resistor 58 to the cathode $k$ and the negative point is connected by resistor 59 to the anode $a$ of the unilaterally conducting device 44. Thus, it may be seen that this device is provided with a biasing voltage of negative polarity as desired. Subsequently, it will be demonstrated by reference to typical values of components that the magnitude of this voltage also is relatively small, as required for the present purposes.

In addition to the junction point between resistors 56 and 57 being negative with respect to the ungrounded terminal of the resistor 55, it also is positive with respect to ground. Since the anode $a'$ of the device 43 is connected to ground by resistor 60, and the cathode $k'$ of this device is connected by resistor 59 to the mid-point of the voltage divider 56—57, it will be seen that the unilaterally conducting device 43 also is provided with a biasing voltage of negative polarity. The magnitude of these biasing voltages may be varied by suitable adjustment of the variable resistor 55 and by this means the operating threshold of the amplitude discriminating network 37 may be set as desired.

Considering now the operation of the noise reduction system embodied in the apparatus shown in Figure 3, it will be assumed that the level of the relatively high frequency alternating voltages derived from the terminal H. F. of the crossover network 34, when impressed upon the input circuit of the amplitude discriminating circuit 37, is lower than the biasing voltages impressed upon the unilaterally conducting devices 43 and 44. These devices, then, are in a substantially non-conducting state. Consequently, there are no alternating voltages developed in the output load resistor 49 for impression upon the amplifier tube 38. Under these conditions, the loud speaker 18 responds only to the relatively low frequency voltages derived from the terminal L. F. of the cross-over network 34 and impressed upon the amplifying tube 38 by resistor 36. As soon as the level of the relatively high frequency alternating voltages derived from the cross-over network 34 exceeds the level of the biasing voltages of the non-linear devices 43 and 44, they substantially instantaneously become highly conductive. Accordingly, these alternating voltages, representing signals having frequencies in the one and one-half octave band between 3,000 and 9,000 cycles per second, are developed in the output load resistor 49, so that they are amplified by the tube 38 and ultimately impressed upon the loud speaker 18 in order that they may be reproduced thereby, together with the relatively low frequency voltages derived from the terminal L. F. of the cross-over network 33.

Thus, it is seen that the amplitude discriminating circuit 37 functions to effectively suppress all alternating voltages impressed thereon having frequencies in the band between 3,000 and 9,000 cycles per second when these voltages have less than a predetermined amplitude. As a result of such operation, substantially all of the background or "hiss" type of noise effects which are predominantly present in signals of this character are prevented from being impressed upon the loud speaker 18 for reproduction as sound effects. For all signal and/or noise voltages within the described band of frequencies having amplitudes greater than the amplitude of the biasing voltages impressed upon the unilaterally conducting devices 43 and 44, the amplitude discriminating circuit 37 functions to transmit such voltages, without substantial modification, to the loud speaker 18.

Inasmuch as the unilaterally conducting devices 43 and 44 function somewhat in the manner of clipping devices, there necessarily is introduced into the signals derived therefrom some harmonic distortion. By suitable means such as the employment of two equally matched devices of the character described and by the connection of them in the opposed polarity shown and described, the even harmonic distortion may be made negligible. However, there is present in the voltages derived from the output load resistor 49 some third and possibly higher harmonic distortion. Accordingly, it is one of the functions of the loud speaker 18 to eliminate virtually all of the third and higher harmonic distortion of the signals derived from the amplitude discriminating circuit. This is accomplished, as previously indicated, by suitably designing the cross-over network 33 so that the crossover frequency is substantially equal to ⅓ of the high cutoff frequency of the loud speaker 18.

Without intending to limit the embodiment of the invention illustrated in Figure 3, the following table of values is given as illustrative of one practical resistor network for deriving from a relatively high voltage unidirectional power supply two substantially equal and oppositely poled, relatively small biasing voltages for impression upon the unilaterally conducting devices 43 and 44. From these values it may be determined that this embodiment of the invention is particularly well adapted for use where a relatively low impedance input circuit and a relatively high impedance output circuit are required. As illustrated in Figure 3, one typical instance in which such facilities are required is when it is desired to couple the amplitude discriminating network between a filter system and a signal amplifier having a high impedance input circuit:

| | |
|---|---|
| Crystals 43, 44 | Sylvania 1N35 |
| Resistors 45, 46 | 100,000 ohms. |
| Power supply 53 | 300 volts. |
| Resistor 54 | 150,000 ohms. |
| Adjustable resistor 55 | 500 ohms. (max.). |
| Resistors 56, 57 | 510 ohms. |
| Resistors 58, 60 | 6,800 ohms. |
| Resistor 59 | 7,500 ohms. |
| Capacitor 61 | 50 microfarads. |

Also, in accordance with the present invention, there is provided a two channel one and one-half octave noise reduction system of the type related to both the copending Olson application referred to and also to the embodiments of Figures 1 and 3, wherein the biasing voltages for the unilaterally conducting devices may be derived by means of a resistor network from a relatively high voltage unidirectional power supply for the purpose of coupling such a system between two relatively low impedance circuits. Such a system is illustrated in Figure 4 wherein the signal source 10 is coupled to the input circuit of a signal amplifying stage 62, the output circuit of which is coupled to the input circuit of a crossover network 63 having a crossover frequency of approximately 3 kilocycles. The high frequency output terminal H. F. of the network 63 is coupled to a second signal amplifying stage 64, the output circuit of which is coupled to the input circuit of another crossover network 65 having a crossover frequency of approximately 5 kilocycles. The low frequency output terminal of the network 63 is coupled to the input circuit of a power amplifier 66. The low frequency terminal L. F. of the crossover network 65 is coupled to the input circuit of a first channel noise reduction circuit 67, the output terminals of which are coupled to the input circuit of a 5 kilocycle low pass filter 68. The output circuit of the low pass filter 68 also is coupled to the input circuit of the power amplifier 66. The high frequency terminal H. F. of the crossover network 65 is coupled to the input terminal 70 of a second channel noise reduction circuit 71, the output terminal 72 of which also is connected to the input circuit of the power amplifier 66.

Thus, it may be seen that the signals derived from the source 10 first are separated into two frequency bands by the crossover network 63. The low frequency band of signal voltages appearing at the terminal L. F. of this network includes all frequencies from 0 to 3 kilocycles, whereas at the terminal H. F. of the crossover network 63, signal voltages of all frequencies over 3 kilocycles are developed. The signal voltages having frequencies of less than 3 kilocycles are impressed directly, without substantial modification upon the power amplifier 66.

The band of frequencies above 3 kilocycles derived from the network 63 is further separated into two bands, the lower frequency one of which includes all frequencies between 3 kilocycles and 5 kilocycles, while the relatively high frequency band of signal voltages derived from the network 65 includes all frequencies above 5 kilocycles. Both bands of frequencies derived from the network 65 are subjected to the respective operation of similar noise reduction circuits 67 and 71, only the latter one of which has been shown in detail and will be described presently.

All three frequency bands of the signals derived from the source 10 finally are combined in the input circuit of the power amplifier 66. The output circuit of the power amplifier 66 includes the primary winding 79 of a coupling transformer 80 which also is provided with a secondary winding 81 coupled to the loud speaker 18. Space current for the amplifier 66 is supplied thereto through the primary winding 79 from a relatively high voltage unidirectional power supply, such as indicated by the battery 82.

The amplitude discriminating circuit 71, as in other forms of the invention disclosed herein, comprises two unilaterally conducting devices 83 and 84, connected in series with resistors 85 and 86, respectively, and in parallel with one another, in opposite polarity, to the input and output terminals 70 and 72, respectively. Again, it is preferred to use as the unilaterally conducting devices germanium crystals, so that it is desirable to impress small negative biasing voltages thereon. These biasing voltages are derived from the power supply 82 by means of a resistor network. This network includes a relatively high resistance bleeder 87 connected across the power supply 82. The bleeder resistor 87 is provided with an adjustable sliding contact 88 which, in accordance with the present invention, preferably should be adjusted toward the grounded terminal of the bleeder resistor so that the portion of this resistor included between the contact 88 and ground forms a relatively low resistance section. The low resistance section of the bleeder 87 also has a voltage divider connected thereacross, including fixed resistors 89 and 90 and a variable resistor 91. The ungrounded terminal of the voltage divider is connected by a resistor 92 to the cathode of the unilaterally conducting device 84. The junction point between voltage divider resistors 89 and 90 is connected to the anode of the device 84 and to the cathode of the device 83. Finally, the anode of the device 83 is connected to ground through the series resistor 85 and a resistor 93. The voltage divider is bypassed to ground by a capacitor 94.

In general, the operation of the two channel embodiment of the invention shown in Figure 4 is substantially similar to the one channel embodiment shown in Figure 3. All signal voltages having frequencies of less than 3 kilocycles are passed at all times, without modification, from the crossover network 63 to the power amplifier 66. All signal voltages having frequencies of more than 3 kilocycles are subjected to the noise reduction facilities provided by the circuits 67 and 71. As distinct however, from the form of the invention shown in Figure 3, the noise suppression operation in the present instance is accomplished separately in two different frequency channels. Frequencies in the band between 3 kilocycles and 5 kilocycles are subject to the non-linear amplitude discriminating operation of the noise reduction circuit 67, whereas all frequencies higher than 5 kilocycles are subject to the operation of the noise reduction circuit 71. As in the embodiment of Figure 3, the high frequency cutoff characteristic of the loud speaker 18 is relied upon to effectively suppress any third or higher harmonic distortion produced by the non-linear conducting devices 83 and 84 of the circuit 71. However, in order to effectively suppress any third or higher harmonic distortion produced by the non-linear conducting devices of the noise reduction circuit 67, it is necessary to provide between the output terminals of the circuit 67 and the input circuit of the power amplifier 66 a low pass filter 68 which has a high frequency cutoff at approximately 5 kilocycles. The use of such a filter, therefore, insures that the frequencies of the voltages derived from the noise suppression circuit 67, as finally impressed upon the amplifier 66 for combination with the other frequency bands of the signal voltages, shall be no higher than the frequencies of the voltages impressed upon the input terminals of the circuit 67.

The operation of the resistor network for impressing the desired biasing voltages upon the unilaterally conducting devices 83 and 84 also is somewhat similar to that of the network shown in Figure 3. The ungrounded terminal of the voltage divider 89, 90 and 91 has a positive polarity with respect to ground and to the junction point between resistors 89 and 90. Consequently, the cathode of the device 84 has a positive polarity relative to its associated anode. Also, since the junction point of the voltage divider resistors 89 and 90 is of positive polarity relative to ground, it is seen that the cathode of the device 83 has a positive polarity with respect to its associated anode. The biasing voltages impressed upon the devices 83 and 84 may be suitably adjusted by proper manipulation of the sliding contact 88 associated with the bleeder resistor 87. The adjustable resistor 91 may be used to suitably proportion the respective biasing voltages of the devices 83 and 84 in order to compensate for any dissimilarity of the devices and thereby effect balanced operation thereof.

In order that one skilled in the art may more fully appreciate the utility of the resistor network for developing the biasing voltages for the unilaterally conducting devices 83 and 84, the following table of values for the essential components of the network are given by way of example only, and it is to be understood that the present form of the invention is susceptible of embodiment in forms other than that indicated in the drawing and in the table.

| | |
|---|---|
| Power supply 82 | 260 volts. |
| Crystals 83, 84 | Sylvania 1N35. |
| Resistors 85, 86 | 1,000 ohms. |
| Resistors 87, 89, 92 | 250,000 ohms. |
| Resistors 90, 93 | 8,200 ohms. |
| Resistor 91 | 500 ohms (max.). |
| Capacitor 94 | 0.02 microfarad. |

From the foregoing description of several illustrated embodiments of the invention, it may be seen that there is provided a highly efficient "hiss" noise reduction system which is particularly advantageous for effectively suppressing noise effects in a relatively high frequency range of the intelligence signals that it is desired to reproduce. It is considered to be obvious that by applying the noise reduction system to signal and/or noise voltages over a frequency band extending for approximately one and one-half octaves, a considerably improved result is obtained over those provided by noise reduction systems of the prior art. While it may be thought that the application of a noise reduction system over a frequency band extending for approximately one and one-half octaves will produce objectionable intermodulation distortion of the reproduced sound effects, it has been found that the present system does not perceptibly have this disadvantage. For example, in the embodiment of the invention disclosed in Figure 3 wherein the noise reduction channel including the amplitude discriminating circuit 37 is effective in a one and one-half octave range of frequencies extending between 3 and 9 kilocycles, theoretically the third harmonic of the 3.5 kilocycle frequency will combine with the third harmonic of the 5 kilocycle frequency to produce a 4.5 kilocycle distortion product. It has been found, however, that if, in fact, there is this type of distortion present in the signals impressed upon the loudspeaker 18, it evidently is of insufficient magnitude to be objectionable. Severe listening tests of noise reduction systems of this character have been made without the detection of this type of distortion.

As previously indicated, by reason of the described operation of the unilaterally conducting devices, there is produced some odd harmonic distortion of the signals derived from the output circuit of the amplitude discriminating networks. In a system of the character disclosed, however, substantially all of such distortion is eliminated by the use of a loudspeaker 18 having a low pass frequency characteristic, whereby to give it a relatively sharp cutoff at frequencies above the range of frequencies which it is desired to reproduce. Also, by taking advantage of the high frequency cutoff characteristic of a transducer such as the loudspeaker 18, the more costly filters of the prior art noise reduction systems may be replaced by relatively inexpensive crossover networks such as those employed in the embodiments of Figures 3 and 4.

A further advantage of a noise reduction system in accordance with the present invention is that germanium crystals may be used as the unilaterally conducting devices in the amplitude discriminating circuit and the desired biasing voltages therefor may be derived by means of a suitable resistor network, in accordance with a feature of the invention, directly from a relatively high voltage unidirectional power supply. Such a facility entirely obviates the necessity of using batteries such as dry cells for the provision of the relatively small biasing voltages. Furthermore, in accordance with the teachings of the present invention, a resistor network of this character may be provided so that the amplitude discriminating circuit may be coupled between either a low impedance signal source and a high impedance utilization circuit or low impedance signal source and utilization circuit.

It also will be understood that the unilaterally conducting devices 24 and 25 of Figure 1 preferably should be germanium crystals provided with sutiable biasing voltages which may be derived either from batteries such as indicated in the copending Olson application referred to or by resistor networks in accordance with the present invention coupled to a relatively high voltage power supply.

It will be obvious to those skilled in the art that the present invention may be embodied in forms other than those specifically disclosed herein for illustrative purposes. Accordingly, the scope of the present invention is to be determined by reference to the appended claims.

What is claimed is:

1. In a signaling system including a circuit providing a source of alternating voltages of variable amplitude, frequency selective means coupled to said circuit to segregate approximately one and one-half octaves of the higher frequency audio signals, an amplitude discriminating circuit comprising a first non-linear unilaterally conducting device consisting of a germanium crystal coupled to said source and having the property of being substantially non-conducting when energized by a voltage of predetermined polarity and relatively small magnitude and being highly conducting when energized by a voltage of opposite polarity, a second non-linear unilaterally conducting device consisting of a germanium crystal coupled to said circuit in shunt with and in opposite polarity to said first mentioned device, means providing for said system a source of unidirectional voltage of relatively large magnitude, and a resistive network for deriving from said unidirectional voltage source and applying to said devices voltages of opposite polarity and relatively small magnitude, said network comprising a relatively high resistance bleeder connected across said unidirectional voltage source, said bleeder including a variable relatively low resistance section, a voltage divider including end terminals and a plurality of serially connected resistors connected therebetween across said low resistance bleeder section, circuit means including two resistors respectively connecting both terminals of said voltage divider to oppositely poled electrodes of said devices, and resistive means connecting the other electrodes of said devices to an intermediate point of said voltage divider, whereby effective low voltage control of said devices with reversed polarity from a single relatively high voltage unidirectional source is attained.

2. An amplitude discriminating circuit as defined in claim 1, in which said voltage divider comprises two substantially equal resistor arms, the respective resistors included in said circuit means are substantially equal, and said resistive means is connected to the junction point of said two equal resistor arms.

References Cited in the file of this patent

UNITED STATES PATENTS

| Number | Name | Date |
|---|---|---|
| 962,262 | Schloemilch et al. | June 21, 1910 |
| 2,073,038 | Wheeler | Mar. 9, 1937 |
| 2,171,671 | Percival | Sept. 5, 1939 |
| 2,173,925 | Tuxen | Sept. 26, 1939 |
| 2,269,011 | Dallos | Jan. 6, 1942 |
| 2,340,364 | Bedford | Feb. 1, 1944 |
| 2,423,263 | Sprague | July 1, 1947 |
| 2,438,518 | Piety | Mar. 30, 1948 |
| 2,497,693 | Shea | Feb. 14, 1950 |
| 2,580,052 | Torre et al. | Dec. 25, 1951 |

FOREIGN PATENTS

| Number | Country | Date |
|---|---|---|
| 693,175 | Germany | July 3, 1940 |